(12) United States Patent
Vivanco et al.

(10) Patent No.: US 9,439,153 B1
(45) Date of Patent: Sep. 6, 2016

(54) SYSTEMS AND METHODS FOR DETERMINING A POWER OPTION FOR AN ACCESS NODE

(71) Applicant: Sprint Spectrum LP, Overland Park, KS (US)

(72) Inventors: Daniel Vivanco, Sterling, VA (US); Chunmei Liu, Great Falls, VA (US); Krishna Sitaram, Chantilly, VA (US)

(73) Assignee: Sprint Spectrum L.P., Overland Park, KS (US)

(*) Notice: Subject to any disclaimer, the term of this patent is extended or adjusted under 35 U.S.C. 154(b) by 107 days.

(21) Appl. No.: 14/247,053

(22) Filed: Apr. 7, 2014

(51) Int. Cl.
| | |
|---|---|
| *H04W 52/18* | (2009.01) |
| *H04W 52/32* | (2009.01) |
| *H04W 52/14* | (2009.01) |
| H04W 52/38 | (2009.01) |
| H04W 52/34 | (2009.01) |
| H04W 52/36 | (2009.01) |

(52) U.S. Cl.
CPC .......... *H04W 52/18* (2013.01); *H04W 52/143* (2013.01); *H04W 52/32* (2013.01); *H04W 52/34* (2013.01); *H04W 52/36* (2013.01); *H04W 52/38* (2013.01)

(58) Field of Classification Search
CPC ... H04W 52/18; H04W 52/20; H04W 52/24; H04W 52/26; H04W 52/28; H04W 52/34; H04W 52/32; H04W 52/40; H04W 52/143; H04W 52/243–52/244; H04W 52/265; H04W 52/343; H04W 52/367; H04W 52/38; H04W 36/18
See application file for complete search history.

(56) References Cited

U.S. PATENT DOCUMENTS

| | | | | |
|---|---|---|---|---|
| 7,787,899 B1* | 8/2010 | Talley | ............... | H04W 52/325 455/450 |
| 8,229,430 B1* | 7/2012 | Singh | ............... | H04W 52/281 455/435.1 |
| 2003/0045317 A1* | 3/2003 | Pan | ............... | H04W 4/10 455/518 |
| 2009/0005102 A1* | 1/2009 | Das | ............... | H04W 52/241 455/522 |
| 2011/0021236 A1* | 1/2011 | Dinan | ............... | H04W 52/262 455/522 |
| 2011/0189997 A1* | 8/2011 | Tiwari | ............... | H04W 36/26 455/443 |
| 2011/0281606 A1 | 11/2011 | Abe et al. | | |
| 2012/0108249 A1* | 5/2012 | Talwar | ............... | H04W 72/0473 455/450 |
| 2012/0122512 A1* | 5/2012 | Nammi | ............... | H04W 52/343 455/522 |
| 2013/0003669 A1* | 1/2013 | Ohara | ............... | H04W 72/0453 370/329 |
| 2013/0143616 A1* | 6/2013 | Han | ............... | H04W 52/18 455/522 |
| 2014/0056374 A1* | 2/2014 | Goransson | ............... | H04W 52/343 375/267 |
| 2015/0009839 A1* | 1/2015 | Shikama | ............... | H04W 52/243 370/252 |
| 2015/0029858 A1* | 1/2015 | Xu | ............... | H04W 52/0206 370/235 |

* cited by examiner

*Primary Examiner* — Habte Mered

(57) ABSTRACT

Systems and methods are described for determining a power option for an access node. Application requirements for a first plurality of wireless devices in communication with a first access node may be identified for each wireless device. The number of wireless devices that comprise a met application requirement may then be determined. When that number meets a first criteria, a plurality of power options for transmitting a first signal may be determined. For each power option, a second number of the first plurality of wireless devices and a third number of wireless devices in communication with a second access node may be estimated. Based on the estimated numbers for the determined power options, a power option may be selected and the first access node may transmit the first signal according to the selected power option.

18 Claims, 13 Drawing Sheets

902

| POWER OPTION | EST. SECOND NUM. | EST. THIRD NUM. |
|---|---|---|
| 1 | 75 | 5 |
| 2 | 75 | 15 |
| 3 | 85 | 20 |
| 4 | 90 | 30 |

904

| SECOND CRITERIA | THIRD CRITERIA | FIRST WEIGHT | SECOND WEIGHT |
|---|---|---|---|
| 75 | 25 | 1.25 | 0.75 |

906

| POWER OPTION | FIRST DIFF. | SECOND DIFF. | WT. FIRST DIFF. | WT. SECOND DIFF. | SUM |
|---|---|---|---|---|---|
| 1 | 0 | 20 | 0 | 15 | 15 |
| 2 | 0 | 10 | 0 | 7.5 | 7.5 |
| 3 | 10 | 5 | 12.5 | 3.75 | 16.25 |

FIG. 9

| POWER OPTION | EST. SECOND NUM. | EST. THIRD NUM. |
|---|---|---|
| 1 | 75 | 5 |
| 2 | 75 | 15 |
| 3 | 85 | 20 |
| 4 | 90 | 30 |

1002

| SECOND CRITERIA | THIRD CRITERIA | FIRST WEIGHT | SECOND WEIGHT |
|---|---|---|---|
| 90 | 5 | 1.25 | 0.75 |

1004

| POWER OPTION | FIRST DIFF. | SECOND DIFF. | WT. FIRST DIFF. | WT. SECOND DIFF. | SUM |
|---|---|---|---|---|---|
| 1 | 15 | 0 | 18.75 | 0 | 18.75 |
| 2 | 15 | 10 | 18.75 | 7.5 | 26.25 |
| 3 | 5 | 15 | 6.25 | 11.25 | 17.25 |
| 4 | 0 | 25 | 0 | 18.75 | 18.75 |

| POWER OPTION | EST. FIRST NUM. | EST. SECOND NUM. |
|---|---|---|
| 1 | 75 | 5 |
| 2 | 75 | 15 |
| 3 | 85 | 20 |
| 4 | 90 | 30 |

1104

| FIRST CRITERIA | SECOND CRITERIA | FIRST WEIGHT | SECOND WEIGHT |
|---|---|---|---|
| 90 | 10 | 1.25 | 0.75 |

1106

| POWER OPTION | FIRST DIFF. | SECOND DIFF. | WT. FIRST DIFF. | WT. SECOND DIFF. | SUM |
|---|---|---|---|---|---|
| 1 | 15 | -5 | 18.75 | -3.75 | 15 |
| 2 | 15 | 5 | 18.75 | 3.75 | 22.5 |
| 3 | 5 | 10 | 6.25 | 7.5 | 13.75 |
| 4 | 0 | 20 | 0 | 15 | 15 |

FIG. 11

SYSTEMS AND METHODS FOR DETERMINING A POWER OPTION FOR AN ACCESS NODE

TECHNICAL BACKGROUND

Telecommunication systems, such as cellular networks or other wireless networks, use wireless signals to establish communication channels between various network devices. For example, an access node may transmit a reference signal or a pilot signal over a signal radius, and one or more wireless devices within the signal radius may attempt to establish a connection with the access node based on the reference signal.

In certain circumstances, it may be advantageous to boost or to increase the power of the reference signal transmitted from an access node. For example, where a wireless device uses a reference signal for channel estimation, increasing the reference signal strength can improve channel quality. Accordingly, power boosting may be performed at an access node such that the signal level of a reference signal, or pilot signal, transmitted by the access node is increased.

OVERVIEW

Systems and methods are described for determining a power option for an access node. A first plurality of wireless devices may be in communication with an access node, and an application requirement may be identified for each of the first plurality of wireless devices. A first number of wireless devices from among the first plurality that comprise a met application requirement may be determined. When the number of wireless devices with a met application requirement meets a first criteria, a plurality of power options for transmitting a first signal may be determined.

For each power option, a second number of wireless devices from among the first plurality of wireless devices may be estimated, where the estimated second number of wireless device may comprise a met application requirement. In addition, for each power option, a third number of a third number of wireless devices in communication with a second access node may be estimated, where the first signal transmitted according to each power option interferes with a communication between the third number of wireless devices and the second access node. Based on the estimated second numbers and the estimated third numbers for the determined power options, a power option may be selected.

BRIEF DESCRIPTION OF THE DRAWINGS

FIG. 9 illustrates a table used to determine a power option for an access node.

FIG. 10 illustrates another table used to determine a power option for an access node.

FIG. 11 illustrates another table used to determine a power option for an access node.

DETAILED DESCRIPTION

Figure 1:
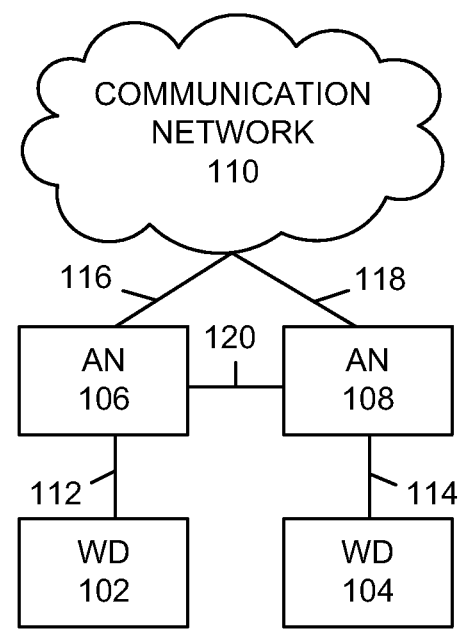
FIG. 1 illustrates an exemplary communication system to determine a power option for an access node.

FIG. 1 illustrates an exemplary communication system 100 to determine a power option for an access node comprising wireless devices 102 and 104, access nodes 106 and 108, communication network 110, and communication links 112, 114, 116, 118, and 120. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 106 and 108, any number of wireless devices can be implemented.

Access nodes 106 and 108 are network nodes capable of providing wireless communications to wireless device 102, and can be, for example, a base transceiver station, a radio base station, an eNodeB device, or an enhanced eNodeB device. Access nodes 106 and 108 may communicate with communication network 110 over communication links 116 and 118. Access nodes 106 and 108 may also communicate directly with each other over communication link 120. In an embodiment, access node 106 can comprise a serving access node for wireless device 102, and access node 108 can comprise a serving access node for wireless device 104.

Although only two access nodes 106 and 108 are illustrated in FIG. 1, wireless devices 102 and 104 can be in communication with a plurality of access nodes. The plurality of access nodes can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may comprise code division multiple access (CDMA)

1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, 118, and 120 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, WIMAX, EV-DO, WiMAX, or 3GPP LTE, or combinations thereof. Other wireless protocols can also be used.

Figure 2:
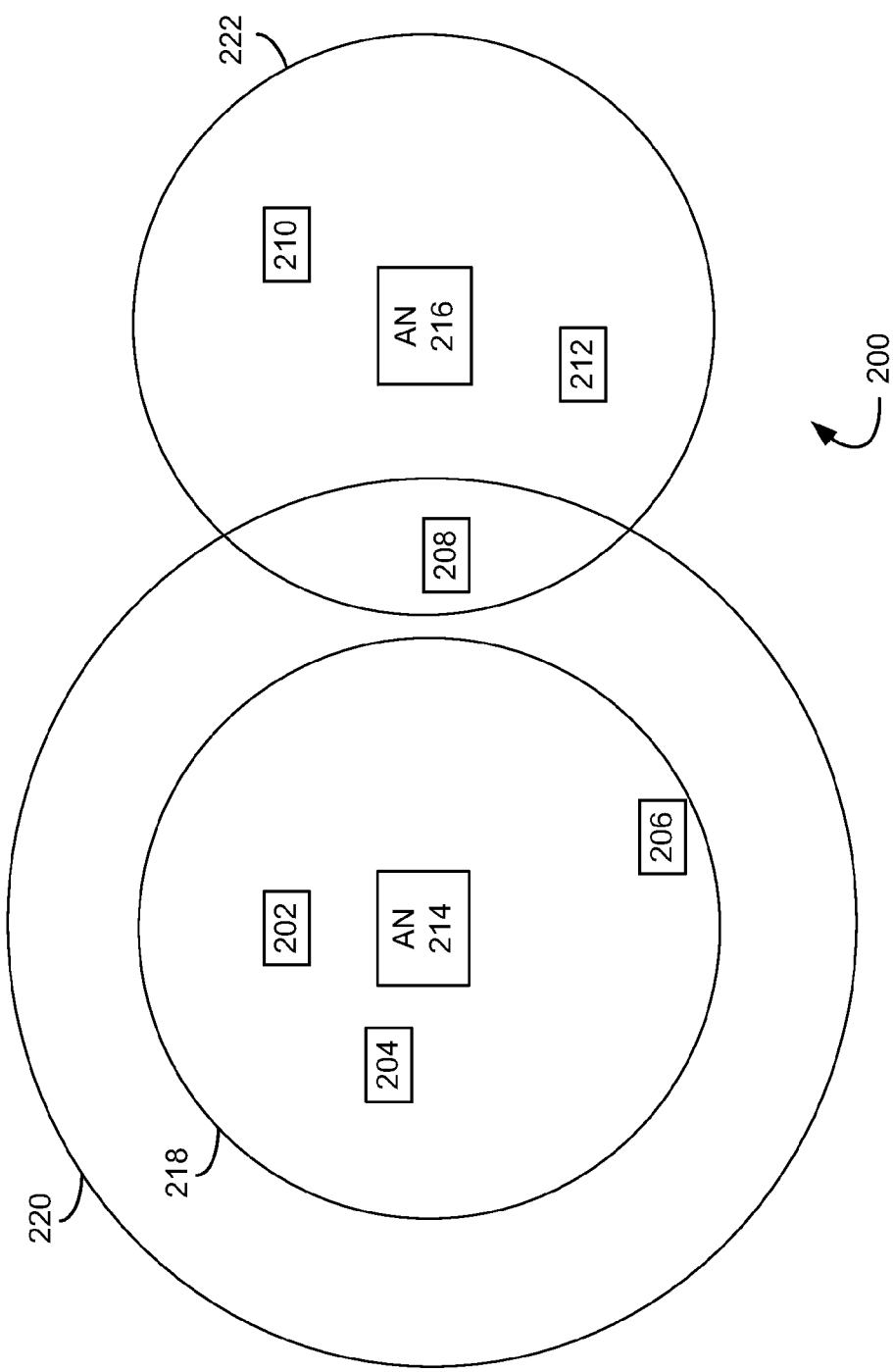
FIG. 2 illustrates another exemplary system to determine a power option for an access node.

FIG. 2 illustrates an exemplary communication system 200 for determining a power option for an access node. System 200 comprises wireless devices 202, 204, 206, 208, 210, and 212, access nodes 214 and 216. Wireless devices 202, 204, 206, 208, 210, and 212 may comprise devices similar to wireless devices 102 and 104 illustrated in FIG. 1. Similarly, access nodes 214 and 216 may comprise access nodes similar to access nodes 106 and 108 illustrated in FIG. 1. Access node 214 comprises signal radii 218 and 220, and access node 216 comprises signal radius 222.

A signal radius, or coverage radius, may comprise an area around an access node within which a wireless device can detect a signal transmitted form the access node. Signal radii 218 and 220 can comprise radii for reference signals, or pilot signals, transmitted from access node 214, and signal radius 222 can comprise a radius for a reference signal, or pilot signal, transmitted from access node 216.

In operation, wireless devices 202, 204, and 206 may establish communication with access node 214 such that access node 214 provides the wireless devices access to a communication network (such as communication network 108, illustrated in FIG. 1). Access node 214 may transmit a reference signal, or a pilot signal, over signal radius 218, to enable wireless devices 202, 204, and 206 to detect access node 214. When a wireless device, such as wireless device 202, detects the reference signal from access node 214, and it is determined that the reference signal from access node 214 meets a threshold signal level, wireless device 202 may attempt to establish communication with access node 214. For example, the signal level may be represented by received signal strength indication (RSSI), reference signal received power (RSRP), reference signal received quality (RSRQ), signal to noise ratio (SINR), or any other suitable metric. Similarly, wireless devices 208, 212, and 210 may establish communication with access node 216 such that access node 216 provides the wireless devices access to a communication network (such as communication network 108, illustrated in FIG. 1)

In an embodiment, wireless devices 202, 204, and 206 can comprise application requirements. An application requirement, or a quality of service (QoS) requirement, may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. For example, wireless device 202 may request an application requirement from access node 214.

In an embodiment, an access node may determine the number of wireless devices in communication with that access node that comprise met application requirements. For example, wireless devices 202, 204, and 206 may request application requirements from access node 214. Access node 214 may determine which of wireless devices 202, 204, and 206 comprise met application requirements. In an example, each of wireless devices 202, 204, and 206 may comprise a QCI and access node 214 may determine whether the service conditions for the QCIs are achieved.

In some instances, wireless devices that are located near an edge of a signal radius for an access node have a higher likelihood of comprising unmet service conditions. For example, wireless devices located at the edge of a signal radius (e.g., a cell edge) may receive signals transmitted from the access node at a lower signal level than wireless devices located closer to the access node. With reference to FIG. 2, wireless devices 202 and 204 may be located closer to access node 214 than wireless device 206 (as depicted). Accordingly, the application requirements for wireless devices 202 and 204 may be met while an application requirement for wireless device 206 may not be met. In another example, one or more application requirements for wireless devices 202, 204, 206 may be unmet due to congestion over communication links between the wireless devices and access node 214. For example, access node 214 may not have the resources available to satisfy the unmet application requirements (e.g., due to a high volume of data sent to or from wireless device in communication with access node 214, or a large number of wireless devices in communication with the access node, and the like).

In an embodiment, power boosting may be performed at an access node to transmit a signal, such as a reference signal or a pilot signal, from the access node with an increased signal level, which may increase the signal radius of the signal. For example, power boosting may be performed in a multi-antenna configuration according to the 3GPP LTE protocol. An access node may comprise at least two antennas and may implement a Multiple Input Multiple Output (MIMO) protocol for sending (as well as receiving) signals. In an embodiment, when a first of the at least two antennas is transmitting a reference signal, the second antenna may not transmit a signal. Accordingly, when the first antenna is transmitting a reference signal, power boosting of the reference signal may be accomplished by using signal power of the second antenna for the reference signal transmitted from the first antenna. Other suitable processes for increasing the transmitted signal level of a reference signal may also be implemented.

In an embodiment, power boosting may be performed to transmit a reference signal, or pilot signal, from an access node with an increased signal level, which may better satisfy application requirements of wireless devices. For example, a reference signal according to the 3GPP LTE protocol may be used for channel estimation by wireless device, and thus a boost in the reference signal power can improve channel quality. These improved channel conditions can lead to a greater ability to satisfy service conditions, and subsequently application requirements, for the wireless devices communicating with the access node.

With reference to FIG. 2, signal radius 218 may comprise a reference signal radius for access node 214 when power boosting is not performed, while signal radius 220 may comprise a reference signal radius for access node 214 when power boosting is performed. In a first example, when power boosting is not performed, application requirements from wireless device 206 may not be met because wireless device 206 is located near the edge of signal radius 218 and, therefore, may detect the reference signal transmitted from access node 214 at a low signal level (e.g., below a threshold level required to satisfy the application requirements from wireless device 206). In a second example, when power boosting is performed, the application requirement wireless 206 may be met since the signal radius 220 is larger than signal radius 218 and wireless device 206 may receive the reference signal from access node 214 at a higher signal level when compared to the first example (e.g., above a threshold level required to satisfy the application requirements from wireless device 206).

Power boosting may be performed only on a reference signal, and may not be performed for other signals transmitted from the access node, such as bearer signals, control signals, and the like. This can result in the reference signal radius of an access node being larger than the signal radius for other signals of the access node. In this example, a wireless device that detects a reference signal from an access node performing power boosting may be out of range for other signals transmitted by the access node. In addition, the wireless device which detects the boosted reference signal may be unable to transmit signals to the access node at a sufficient signal level to reach the access node performing power boosting. In such case, a handover to the access node performing power boosting may be attempted due to the increased reference single power, but this handover may fail because of the discrepancy in signal radii described above. Additionally, this type of mismatch between reference signal radius and other signal radii can result in service interruptions such as dropped calls, lagging or poor quality media streams, or other service interruptions.

In some scenarios, transmitting a reference signal with an increased power may negatively affect wireless devices communicating with neighboring access nodes. For example, a first access node may transmit a reference signal with an increased signal radius and a wireless device may be in communication with a second access node that is adjacent to the first access node. The reference signal transmitted with the increased power form the first access node may have a greater area of overlap with a coverage area of the second access node. When the wireless device is located in an overlap area (e.g., an area that is within the reference signal radii for both the first access node and the second access node), wireless signals used in communication between the second access node and the wireless device may experience interference from the first access node's reference signal due to the increased signal radius.

With reference to FIG. 2, wireless device 208 may be in communication with access node 216 and access node 216 may comprise signal radius 222. In an example, when access node 214 performs power boosting, the expanded signal radius 220 for the reference signal transmitted from access node 214 may overlap with signal radius 222. As illustrated, wireless device 208 may be located within signal radius 220 and signal radius 222. Subsequently, the reference signal transmitted with an increased power from access node 214 may interfere with communication between wireless device 208 and access node 216. For example, a handover of wireless device 208 to access node 214 may be attempted based on the reference signal transmitted from access node 214 and detected at wireless device 208. Accordingly, wireless device 208 may commence a handover process and attempt to communicate with access node 214 to complete the handover. The handover may then fail because wireless device 208 may be out of range to perform the handover to access node 214 (e.g., signals transmitted from wireless device 208 may not comprise radii large enough to reach access node 214 and/or signals other than the reference signal transmitted from access node 214 may not comprise radii large enough to reach wireless device 208). Note that wireless devices 210 and 212 may also be in communication with access node 216, however, the communication between wireless devices 210 and 212 and access nodes 216 may not be interfered with (or may be interfered with at a level below a threshold) because wireless devices 210 and 212 are not located within signal radius 220.

In operation, a first plurality of wireless devices may be in communication with an access node, and an application requirement may be identified for each wireless device. A first number of wireless devices that comprise a met application requirement from among the first plurality of wireless devices may then be determined. When the number of wireless devices with a met application requirement meets a first criteria, a plurality of power options for transmitting a first signal, such as a reference signal or a pilot signal, may be determined. Each power option may comprise an option for transmitting a reference signal from the first access node with a particular power.

For each power option, a second number of the first plurality of wireless devices that would comprise a met application requirement when the first access node performs the power option may be estimated. In addition, for each power option, a third number of wireless devices in communication with a second access node may be estimated, where the first signal is projected to interfere with communication between the third number wireless devices and the second access node when the first access node performs the power option. Based on the estimated numbers for the determined power options, a power option may be selected, and the first access node may transmit the first signal according to the selected power option.

Figure 3:
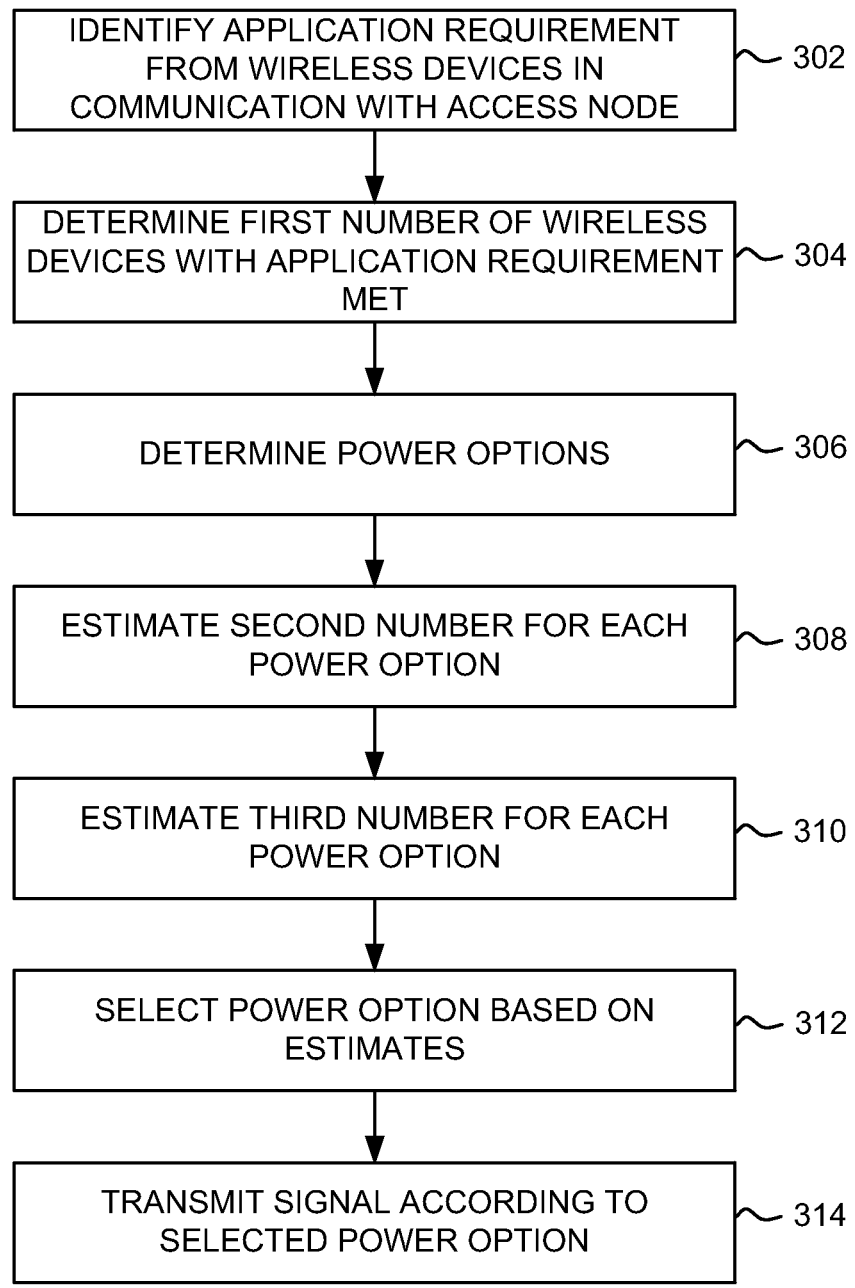
FIG. 3 illustrates an exemplary method of determining a power option for an access node.

FIG. 3 illustrates an exemplary method for determining a power option for an access node. The method will be discussed with reference to the exemplary communication system 200 illustrated in FIG. 2, however, the method can be implemented with any suitable communication system.

Referring to FIG. 3, at step 302, an application requirement for each of a first plurality of wireless devices in communication with a first access node is identified. For example, wireless devices 202, 204, and 206 may be in communication with access node 214 and an application requirement for each of wireless devices 202, 204, and 206 may be identified. The application requirement may comprise a QCI, a GBR, a MBR, a priority, a minimum bit rate, a maximum permitted data delay, a minimum throughput, a maximum error rate, a maximum data loss rate, and any other suitable conditions. In an embodiment, applications running on wireless devices 202, 204, and 206 may be detected, and the identified application requirements may be based on the detected running applications.

At step 304, a first number of wireless devices from among the first plurality of wireless devices is determined, where the first number of wireless devices comprise application requirements that are met. For example, wireless devices 202, 204, and 206 may each send a request to access node 214 for uplink resources comprising a minimum bit rate to meet application requirements of an application running on each of wireless devices 202, 204, and 206. As another example, wireless devices 202, 204, and 206 may request data for an application running on each of wireless devices 202, 204, and 206 at a maximum permitted data delay, a minimum throughput, a maximum error rate, a maximum data loss rate, and the like. Access node 214 may then determine whether the application requirements for wireless devices 202, 204, and 206 can be met. For example, access node 214 may determine that the application requirements from wireless devices 202 and 204 are met, while the application requirement from wireless device 206 is not met.

At step 306, when the first number of wireless devices meets a first criteria, a plurality of power options for transmitting a first signal from the first access node are determined. For example, a plurality of options for transmitting a signal, such as a reference signal or a pilot signal, from access node 214 with an increased power (e.g., performing power boosting) may be determined. The plurality of options may be determined when the first number of the first plurality of wireless devices meets a first criteria, such as when the first number is below a threshold amount (e.g., when the first number is less than 80% of the first plurality wireless devices).

In an embodiment, the determined power options may comprise options for transmitting the first signal, such as a reference signal or pilot signal, with a plurality of powers. In an example where an access node comprises a multi-antenna configuration, when a first antenna is transmitting a reference signal, power options may comprise: using power from a first antenna to transmit the reference signal; using power from a first antenna and a second antenna to transmit the reference signal; using power from a first antenna, a second antenna, and a third antenna to transmit the reference signal; using power from a first antenna, a second antenna, a third antenna, and a fourth antenna to transmit the reference signal, and so on.

In an embodiment, a reference signal transmitted without a boosted power (e.g., using power form 1 antenna) may comprise a signal level of 1.5 dB. The determined power options may comprise transmitting the reference signal with a signal level of 1.5 dB (power from 1 antenna), 3 dB (power from 2 antennas), 4.5 dB (power from 3 antennas), 6 dB (power from 4 antennas), and so on. Other suitable processes for increasing the power of a transmitted signal and determining power options may also be implemented.

For each power option, a second number from among the first plurality of wireless devices is estimated, where the second number of wireless devices comprise application requirements that are met (step 308). In an embodiment, a first access node may be in communication with a plurality of wireless devices, where an application requirement for each wireless device has been identified. An estimated second number for a power option may comprise the number of wireless devices that will have the application requirement for that wireless device met when the first access node transmits a signal, such as a reference signal or pilot signal, according to the power option For example, four power options may be determined at step 306. Accordingly, a second number for each of the four power options may be estimated. When estimating for the first power option, based on the first access node transmitting the first signal with a power according to the first power option (e.g., a signal level of 1.5 dB), it may be estimated how many of the first plurality of wireless device will have their application requirement met. When estimating for the second power option, based on the first access node transmitting the first signal with a power according to the second power option (e.g., a signal level of 3 dB), it may be estimated how many of the first plurality of wireless device will have their application requirement met. This may be repeated for each of the power options until a second number for each of the power options has been estimated.

At step 310, for each power option, a third number of wireless devices in communication with a second access node is estimated, wherein the first signal transmitted according to each power option interferes with a communication between the third number of wireless devices and the second access node. In an embodiment, a first access node may be in communication with a first plurality of wireless devices and a second access node may be in communication with a second plurality of wireless devices, where the two access node are neighboring. An estimated third number for a power option may comprise a number of the second plurality of wireless devices that will experience interference (e.g., interference beyond a threshold level) when the first access node transmits a signal, such as a reference signal or pilot signal, according to the power option.

For example, four power options may be determined at step 306. Accordingly, a third number for each of the four power options may be estimated. When estimating for the first power option, based on the first access node transmitting the first signal with a power according to the first power option (e.g., a signal level of 1.5 dB), it may be estimated how many of the second plurality of wireless device will experience interference (e.g., interference beyond a threshold level). In this example, the third number may be estimated based on ascertained locations for the second plurality of wireless devices and a projected overlap between signal radii for the first access node and the second access node. When estimating for the second power option, based on the first access node transmitting the first signal with a power according to the second power option (e.g., a signal level of 3 dB), it may be estimated how many of the second plurality of wireless device will experience interference (e.g., interference beyond a threshold level). This may be repeated for each of the power options until a third number for each of the power options has been estimated.

At step 312, a power option is selected based on the estimated second numbers and the estimated third numbers. In an embodiment, the estimated second numbers and the estimated third numbers for each power option may be weighed, and a power option may be selected based on the weighing. For example, for each power option, the estimated second number and estimated third number may be compared to criteria, and a power option may be selected based on the comparisons.

At step 314, the first signal may be transmitted according to the selected power option. For example, a first signal, such as a reference signal or pilot signal, may be transmitted according to the selected power option. In this example, the power options may comprise a plurality signal levels for transmitting the first signal (e.g., 1.5 dB, 3 dB, 4.5 dB, 6 dB, and the like), and the first signal may be transmitted with a signal level corresponding to the selected power option.

Figure 4:
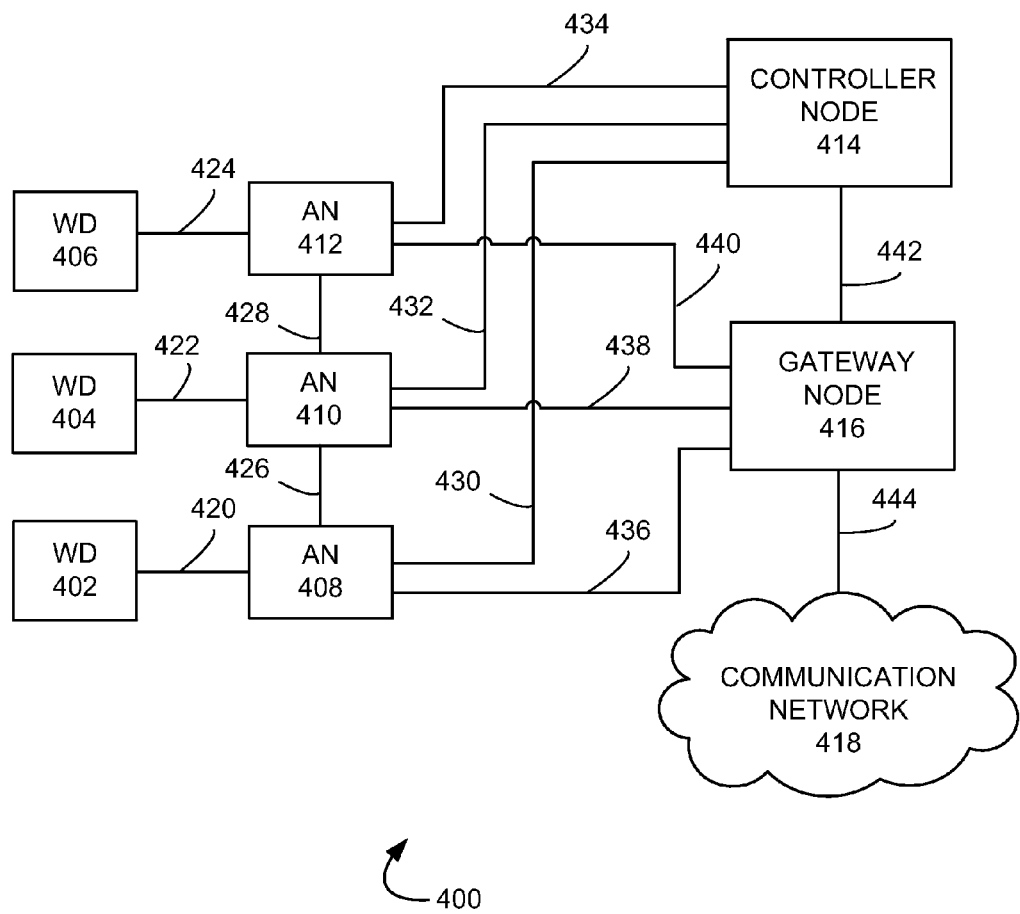
FIG. 4 illustrates another exemplary system to determine a power option for an access node.

FIG. 4 illustrates another exemplary communication system 400 to determine a communication access node for a wireless device. Communication system 400 may comprise a wireless devices 402, 404, and 406 access nodes 408, 410, and 412, controller node 414, gateway node 416, communication network 418, and communication links 420, 422, 424, 426, 428, 430, 432, 434, 436, 438, 440, 442, and 444. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402, 404, and 406 can be any device configured to communicate over communication system 400 using a wireless communication link. For example, wireless devices 402, 404, and 406 can include a cell phone, a smart phone, a computing platform such as a laptop, palmtop, or a tablet, a personal digital assistant, or an internet access device, and combinations thereof.

Access nodes 408, 410, and 412 are network nodes capable of providing wireless communications to wireless devices 402, 404, and 406, and can be, for example, a base transceiver station, a radio base station, an eNodeB device, or an enhanced eNodeB device. In an embodiment, access node 408 can comprise a serving access node for wireless device 402, access node 410 can comprise a serving access node for wireless device 404, and access node 410 can comprise a serving access node for wireless device 406. Access nodes 408, 410, and 412 may communicate with controller node 414 over communication links 430, 432, and 434, and with gateway node 416 over communication links 436, 438, and 440. Access nodes 408, 410, and 412 may also communicate directly with each other over communication links 426 and 428.

Gateway node 416 is a network element which can comprise a processor and associated circuitry to execute or direct the execution of computer-readable instructions. Gateway node 416 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 416 can provide instructions to access nodes 406, 404, and 408 related to channel selection in communications with wireless devices 402, 404, and 406. For example, gateway node 416 can comprise at least one of a serving gateway (SGW), a packet data network gateway (PDNGW), a cellular gateway (CGW), and a combination thereof. Gateway node 416 may communicate with controller node 414 over communication link 442 and with communication network 418 over communication link 444.

Controller node 414 can comprise any network node configured to manage services within system 400. Controller node 414 may provide other control and management functions for system 400. For example, controller node 414 can be further configured to determine a power option for an access node. The controller node 414 can comprise a single device having various functions or a plurality of devices having differing functions. For example, controller node 414 can include at least one of a multi-cell/multicast coordination entity (MCE), a mobility management entity (MME), a radio network controller (RNC), a mobile switching center (MSC), and a combination thereof.

Controller node 414 can comprise a processor and associated circuitry to execute or direct the execution of computer-readable instructions to obtain information. Controller node 414 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 414 can receive instructions and other input at a user interface. Controller node 510 can comprise a processor and associated circuitry to execute or direct the execution of computer-readable instructions to obtain information.

Controller node 414 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 414 can receive instructions and other input at a user interface.

Communication network 418 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 418 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 418 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 420, 422, 424, 426, 428, 430, 432, 434, 436, 438, 440, 442, and 444 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 408, 410, and 412, controller node 414, gateway node 416, and communication network 418 which are omitted for clarity, including additional processing nodes, routers, gateways, and physical and/or wireless data links for carrying data among the various network elements.

Figure 5:
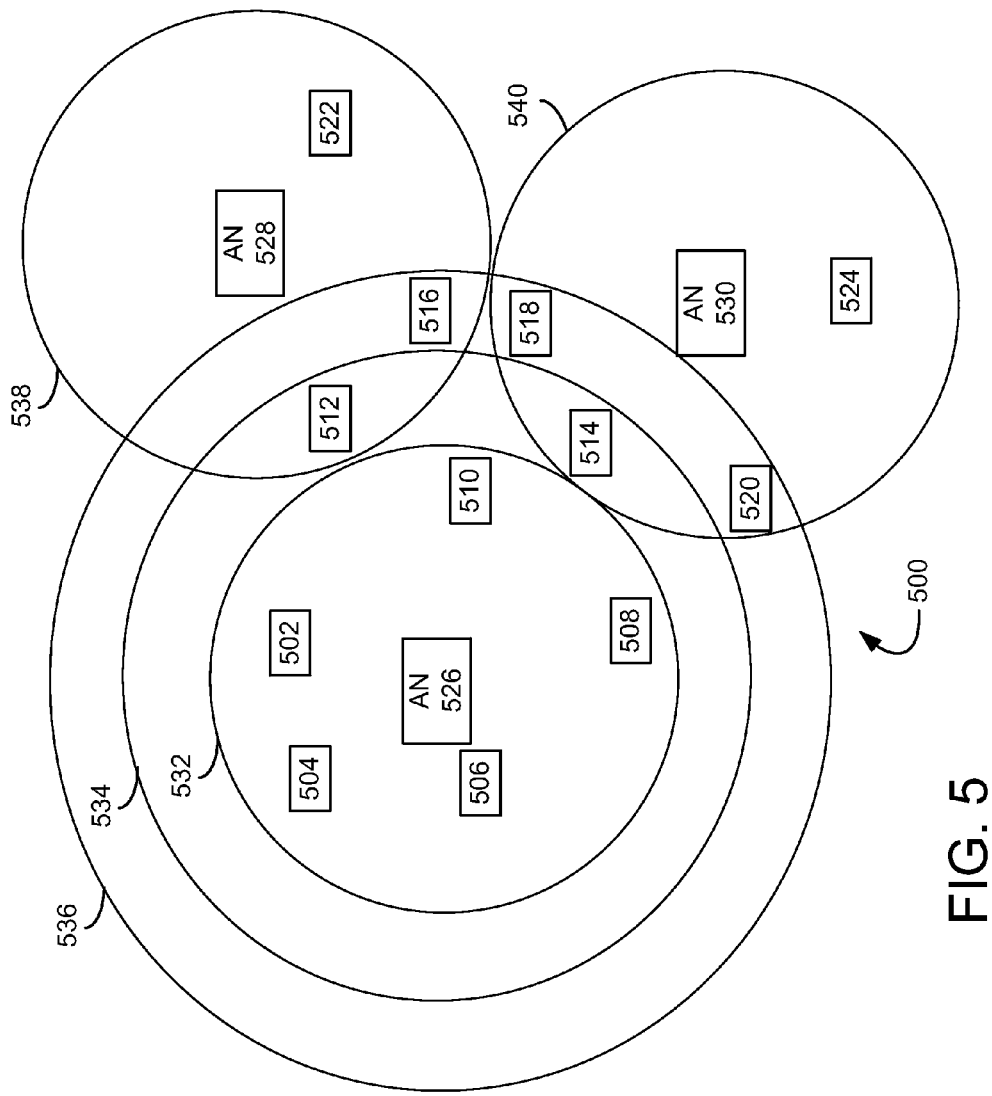
FIG. 5 illustrates another exemplary system to determine a power option for an access node.

FIG. 5 illustrates an exemplary communication system 500 for determining a power option for an access node. System 500 comprises a wireless devices 502, 504, 506, 508, 510, 512, 514, 516, 518, 520, 522, and 524, and access nodes 526, 528, and 530. Wireless devices 502, 504, 506, 508, 510, 512, 514, 516, 518, 520, 522, and 524 may comprise devices similar to wireless device 402 of FIG. 4. Similarly, access nodes 526, 528, and 530 may comprise access nodes similar to access nodes 408 of FIG. 4.

Access nodes 526, 528, and 530 may each transmit signals, such as reference signals or pilot signals, over signal radii. In an embodiment, access node 526 may transmit a signal according to a plurality of power options. Accordingly, when access node 526 transmits the signal according to a first power option, the signal may comprise radius 532, when access node 526 transmits the signal according to a second power option, the signal may comprise radius 534, and when access node 526 transmits the signal according to a third power option, the signal may comprise radius 536. Access node 528 may transmit a signal over radius 538 and access node 530 may transmit a signal over radius 540.

In an embodiment, wireless devices 502, 504, 506, 508, and 510 may be in communication with access node 526, wireless devices 512, 516, and 522 may be in communication with access node 528, and wireless devices 514, 518, 520, and 524 may be in communication with access node 530. Wireless devices 502, 504, 506, 508, and 510 can comprise application requirements, such as a minimum bit rate, that are requested from access node 526. Access node 526 may determine which of wireless devices 502, 504, 506, 508, and 510 comprises met application requirements. For example, each of wireless devices 502, 504, 506, 508, and 510 may comprise a minimum bit rate application requirement and access node 526 may determine whether the service conditions for the minimum bit rates are achieved.

In some instances, wireless devices that are located near an edge of a signal radius for an access node have a higher likelihood of comprising unmet service conditions. With reference to FIG. 5, wireless devices 502, 504, and 506 may be located closer to access node 526 than wireless devices 508 and 510 (as depicted). Accordingly, the application requirements for wireless devices 502, 504, and 506 may be met while application requirements for wireless devices 508 and 510 may not be met. In another example, one or more application requirements for wireless devices 502, 504, 506, 508, and 510 may be unmet due to radio congestion. For example, access node 526 may not have the resources available to meet the application requirements (e.g., due to a high volume of wireless devices in communication with the access node).

In an embodiment, power boosting may be performed at an access node as a potential mitigation against unmet application requirements. With reference to FIG. 5, access node 526 may perform power boosting to transmit a reference signal, or pilot signal, from an access node with an increased signal level such that the power boosting increases the satisfaction of unmet application requirements. Access node 526 may transmit the signal according to a plurality of power options. For example, when access node 526 transmits the signal according to a first power option, the signal may comprise radius 532, when access node 526 transmits the signal according to a second power option, the signal may comprise radius 534, and when access node 526 transmits the signal according to a third power option, the signal may comprise radius 536.

In some scenarios, transmitting a reference signal with an increased power may cause interference with wireless devices communicating with neighboring access nodes. For example, when power boosting is performed and the reference signal radius for an access node is expanded, other signals transmitted from the access node, such as bearer signals, control signals, and any other suitable signals, may not comprise such an expanded radius. In such case, a handover to the access node performing power boosting may be attempted due to the increased reference single power, but this handover may fail because of the discrepancy in signal radii described above. Additionally, this type of mismatch between reference signal radius and other signal radii can result in service interruptions such as dropped calls, lagging or poor quality media streams, or other service interruptions.

In some scenarios, transmitting a reference signal with an increased power may negatively affect wireless devices communicating with neighboring access nodes. For example, a first access node may transmit a reference signal with an increased signal radius and a wireless device may be in communication with a second access node that is adjacent to the first access node. The reference signal transmitted with the increased power form the first access node may have a greater area of overlap with a coverage area of the second access node. When the wireless device is located in an overlap area (e.g., an area that is within the reference signal radii for both the first access node and the second access node), wireless signals used in communication between the second access node and the wireless device may experience interference from the first access node's boosted reference signal.

With reference to FIG. 5, when performing the second power option, signal radius 534 may overlap with signal radius 538 and signal radius 540. Subsequently, the reference signal transmitted with an increased power from access node 526 may interfere with communication between wireless device 512 and access node 528 and between wireless device 514 and access node 530. For example, a handover of wireless device 512 to access node 526 may be attempted based on the reference signal transmitted from access node 526 and detected at wireless device 512. Accordingly, wireless device 512 may commence a handover process and attempt to communicate with access node 526 to complete the handover. The handover may then fail because wireless device 512 may be out of range to perform the handover to access node 526 (e.g., signals transmitted from wireless device 512 may not comprise radii large enough to reach access node 526 and/or signals other than the reference signal transmitted from access node 526 may not comprise radii large enough to reach wireless device 512).

Similarly, when performing the third power option, signal radius 536 may overlap with signal radius 538 and signal radius 540. Subsequently, the reference signal transmitted with an increased power from access node 526 may interfere with communication between wireless device 512 and access node 528, wireless device 516 and access node 528, wireless device 514 and access node 530, wireless device 518 and access node 530, and wireless device 520 and access node 530.

Figure 6:
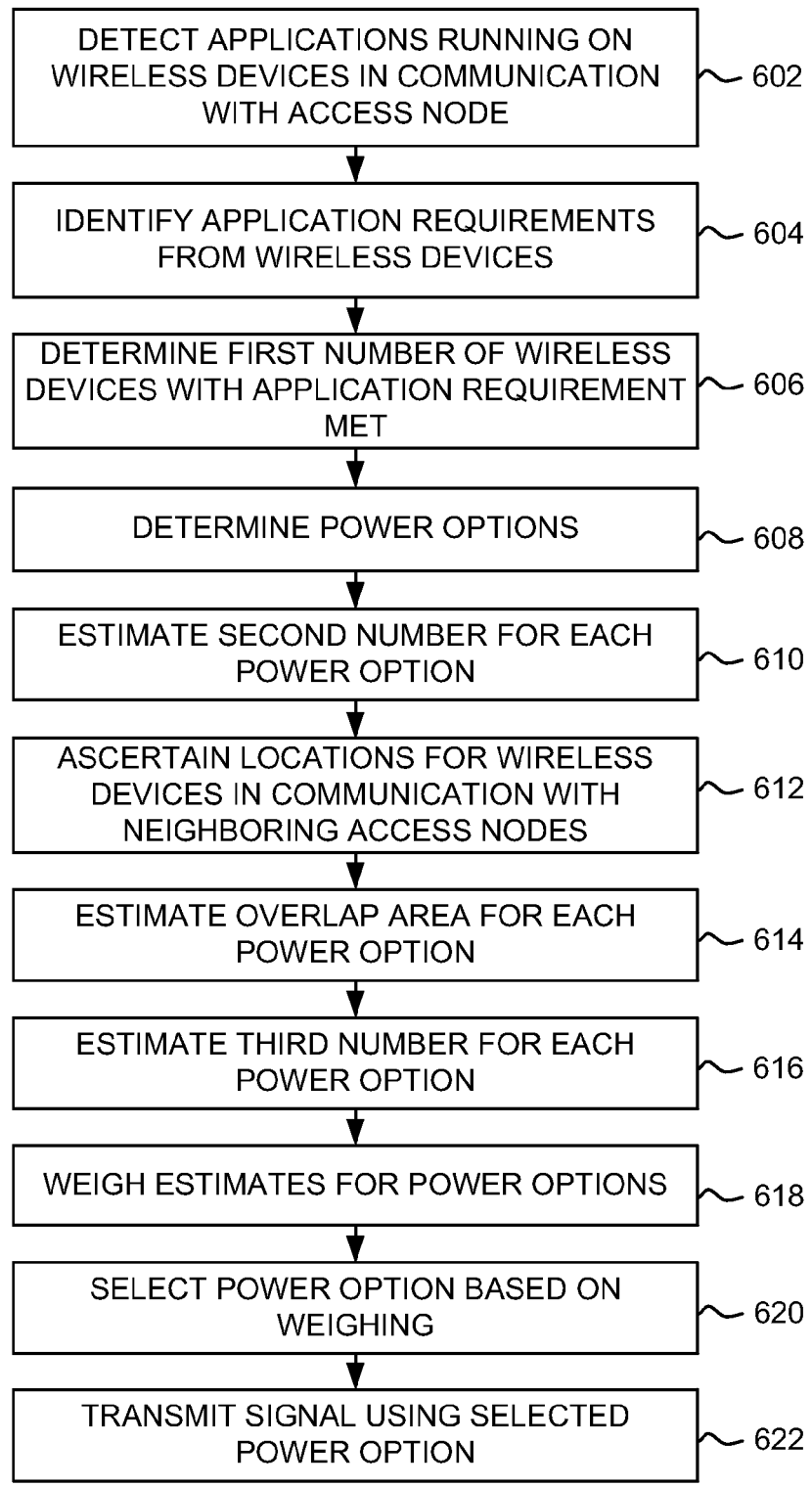
FIG. 6 illustrates another exemplary method of determining a power option for an access node.

In an embodiment, a power option may be selected for transmitting a signal, such as a reference signal or pilot signal, from an access node. For example, the selection may be based on estimated application requirements that would be met by the selected power option and estimated interference that may be caused by the selected power option. FIG. 6 further describes an exemplary method for selecting such a power option.

FIG. 6 illustrates an exemplary method for determining a power option for an access node. The method will be discussed with reference to the exemplary communication system 500 illustrated in FIG. 5, however, the method can be implemented with any suitable communication system.

Referring to FIG. 6, at step 602, applications running on wireless devices in communication with an access node are detected. For example, wireless devices 502, 504, 506, 508, and 510 may be in communication with access node 526 and applications running on the wireless devices may be detected. The detected application may be, for instance, a Voice over IP (VoIP) application, a media streaming application, a messaging application, a web browser, or any other suitable application that is used to communicate over a network.

Referring to FIG. 6, at step 604, an application requirement for each of a first plurality of wireless devices in communication with a first access node is identified. For example, an application requirement for each of wireless devices 502, 504, 506, 508, and 510 may be identified. The application requirements may comprise a QCI, a GBR, a MBR, a priority, a minimum bit rate, a maximum permitted data delay, a minimum throughput, a maximum error rate, a maximum data loss rate, and any other suitable requirement.

In an embodiment, the identified application requirement for each of the first plurality of wireless devices may be based on the detected applications running on the first plurality of wireless devices. For example, an application detected to be running on wireless device 502, such as a VoIP application, may be associated with an application requirement, such as a minimum bit rate. Accordingly, the identified application requirement from wireless device 502 may comprise a minimum bit rate associated with the running VoIP application. In other examples, a plurality of applications may be running on wireless device 502 and the application requirements from wireless device 502 may comprise a plurality of application requirements associated with the running applications.

At step 606, a first number of wireless devices from among the first plurality of wireless devices is determined, where the first number of wireless devices comprise application requirements that are met. For example, wireless devices 502, 504, 506, 508, and 510 may each request an application requirement, such as a minimum bit rate requirement, from access node 526. Access node 526 may then determine whether the service conditions for the application requirements from wireless devices 502, 504, 506, 508, and 510 are met. For example, access node 526 may determine that the application requirements from wireless devices 502, 504 and 506 are met, while the application requirements from wireless devices 508 and 510 are not met.

At step 608, when the first number meets a first criteria, a plurality of power options for transmitting a first signal from the first access node are determined. For example, a plurality of power options for transmitting a signal, such as a reference signal or a pilot signal, from access node 526 with an increased power (e.g., performing power boosting) may be determined. The plurality of options may be determined when the first number of the first plurality of wireless devices meets a first criteria, such as when the first number is below a threshold amount (e.g., when the first number is less than 80% of the first plurality wireless devices).

In an embodiment, the determined options may comprise options for transmitting the first signal, such as a reference signal or pilot signal, with a plurality of powers. In an example where an access node comprises a multi-antenna configuration, when a first antenna is transmitting a reference signal, power options may comprise: using power from a first antenna to transmit the reference signal; using power from a first antenna and a second antenna to transmit the reference signal; using power from a first antenna, a second antenna, and a third antenna to transmit the reference signal; using power from a first antenna, a second antenna, a third antenna, and a fourth antenna to transmit the reference signal, and so on.

In an embodiment, a reference signal transmitted without a boosted power (e.g., using power from one antenna) may comprise a signal level of 1.5 dB. The power options may comprise transmitting the reference signal with a signal level of 1.5 dB (power from 1 antenna), 3 dB (power from 2 antennas), 4.5 dB (power from 3 antennas), 6 dB (power from 4 antennas), and so on. Other suitable processes for increasing the power of a transmitted signal and determining power options may also be implemented.

For each power option, a second number from among the first plurality of wireless devices is estimated, where the second number of wireless devices comprise application requirements that are met (step 610). In an embodiment, a first access node may be in communication with a plurality of wireless devices, where an application requirement for each wireless device has been identified. An estimated second number for a power option may comprise the number of wireless devices that will have the application requirement for that wireless device met when the first access node transmits a signal, such as a reference signal or pilot signal, according to the power option.

For example, four power options may be determined at step 608. Accordingly, a second number of wireless devices for each of the four power options may be estimated. When estimating for the first power option, based on the first access node transmitting the first signal with a power according to the first power option (e.g., a signal level of 1.5 dB), it may be estimated how many of the first plurality of wireless device will have their application requirement met. When estimating for the second power option, based on the first access node transmitting the first signal with a power according to the second power option (e.g., a signal level of 3 dB), it may be estimated how many of the first plurality of wireless device will have their application requirement met. This may be repeated for each of the power options until a second number for each of the power options has been estimated.

At step 612, locations are ascertained for wireless devices that are in communication with neighboring access nodes. For example, locations may be ascertained for wireless devices 512, 516, and 522 in communication with access node 528 and for wireless devices 514, 518, 520, and 524 in communication with access node 530. In an embodiment, the locations may be ascertained based on the signal level for one or more detected signals. For example, wireless device 516 may receive one or more signals (e.g., reference signals or pilot signals) at a signal level from at least one of access node 526, access node 528, and access node 530. The signal level may be represented by RSSI, RSRP, RSRQ, SINR, or any other suitable metric. Based on the signal levels detected from at least one of access node 526, 528, and 530, wireless device 516's distance from the access nodes may be estimated. Where a signal is detected from at least two access nodes, the ascertained location of wireless device 516 may be based on signal triangulation of the signals.

In another embodiment, the ascertained location of wireless device 516 may be based on sectors for one or more of access nodes 526, 528, and 530. For example, an access node may be split into multiple sectors (e.g., 3 sectors measuring 120 degree arcs), and one or more signals may be transmitted over each sector (e.g., a reference signal or pilot signal). Accordingly, wireless device 516 may detect a signal from access node 528 and a location may be ascertained for wireless device 516 based on the sector associated with the detected signal. In an embodiment, a location may be ascertained for wireless device 516 based on both the signal levels detected at the wireless device for signals from at least one of access nodes 526, 528 and 530 and the sectors associated with those detected signals.

At step 614, for each power option, an overlap area is estimated. In an embodiment, a coverage radius may be determined for a first signal. For example, a coverage radius may be determined for the first signal transmitted from access node 526 (e.g. signal radius 532). In this example, four power options may be determined at step 608. For each power option, an increased coverage radius of the first signal may be estimated. For example, for the second power option (e.g., transmitting a reference signal with a 3 dB signal level), an increased coverage radius may be estimated (e.g., increased signal radius 534). An overlap area may then be determined between the increased coverage radius for the first signal from access node 526 and signal radii from neighboring access nodes (e.g., signal radius 538 from access node 528 and signal radius 540 from access node 530). As illustrated, the determined overlap area may comprise overlap between estimated signal radius 534 and signal radius 538 and the overlap between estimated signal radius 534 and signal radius 540.

At step 616, for each power option, a third number of wireless devices in communication with a second access node is estimated, wherein the first signal transmitted according to each power option interferes with a communication between the third number of wireless devices and the second access node. In an embodiment, a first access node may be in communication with a first plurality of wireless devices and a second access node may be in communication with a second plurality of wireless devices, where the two access node are neighboring. An estimated third number for a power option may comprise a number of the second plurality of wireless devices that will experience interference (e.g., interference beyond a threshold level) when the first access node transmits a signal, such as a reference signal or pilot signal, according to the power option.

For example, four power options may be determined at step 608. Accordingly, a third number for each of the four power options may be estimated. When estimating for the first power option, based on the first access node transmitting the first signal with a power according to the first power option (e.g., a signal level of 1.5 dB), it may be estimated how many of the second plurality of wireless device will experience interference (e.g., interference beyond a threshold level). When estimating for the second power option, based on the first access node transmitting the first signal with a power according to the second power option (e.g., a signal level of 3 dB), it may be estimated how many of the second plurality of wireless device will experience interference (e.g., interference beyond a threshold level). In these examples, the estimated interference may comprise failed handovers based on the detected first signal or interference of wireless signals used for communication between the second plurality of wireless devices and the neighboring access nodes (e.g., signal interference above a threshold). This may be repeated for each of the power options until a third number for each of the power options has been estimated.

In an embodiment, the third number of wireless devices may be estimated based on ascertained locations for the second plurality of wireless devices and a determined overlap area. For example, at step 612, locations may be ascertained for a second plurality of wireless devices that are in communication with neighboring access nodes. At step 614, for each power option, an overlap area may be estimated. For a particular power option, the estimated third number of wireless devices may comprise the subset of the second plurality of wireless devices that comprise ascertained locations within the determined overlap area for that power option. Because the ascertained locations for the wireless devices are within the determined overlap area, it may be projected that these wireless devices will experience interference.

At step 618, the estimated second number and the estimated third number for each power option are weighed. For example, for each power option, the estimated second number and estimated third number may be compared to criteria. FIGS. 7-11 further illustrate the weighing of power options.

At step 620, a power option is selected based on the estimated second number and the estimated third number. For example, a power option may be selected based on the weighing at step 618. At step 622, the first signal may be transmitted according to the selected power option. For example, a first signal, such as a reference signal or pilot signal, may be transmitted according to the selected power option. In this example, the power options may comprise a plurality signal levels for transmitting the first signal (e.g., 1.5 dB, 3 dB, 4.5 dB, 6 dB, and the like), and the first signal may be transmitted with a signal level corresponding to the selected power option.

Figure 7:
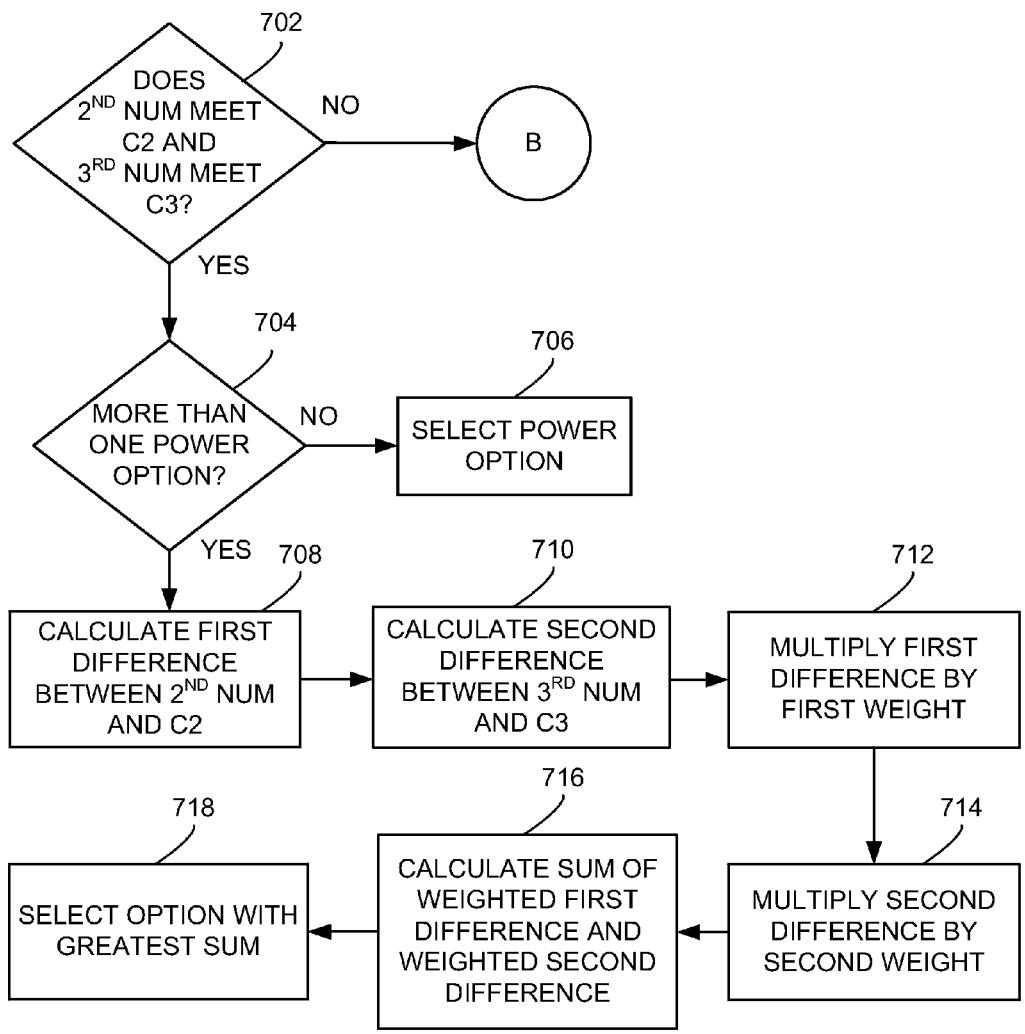
FIG. 7 illustrates another exemplary method of selecting a power option for an access node.
Figure 8:
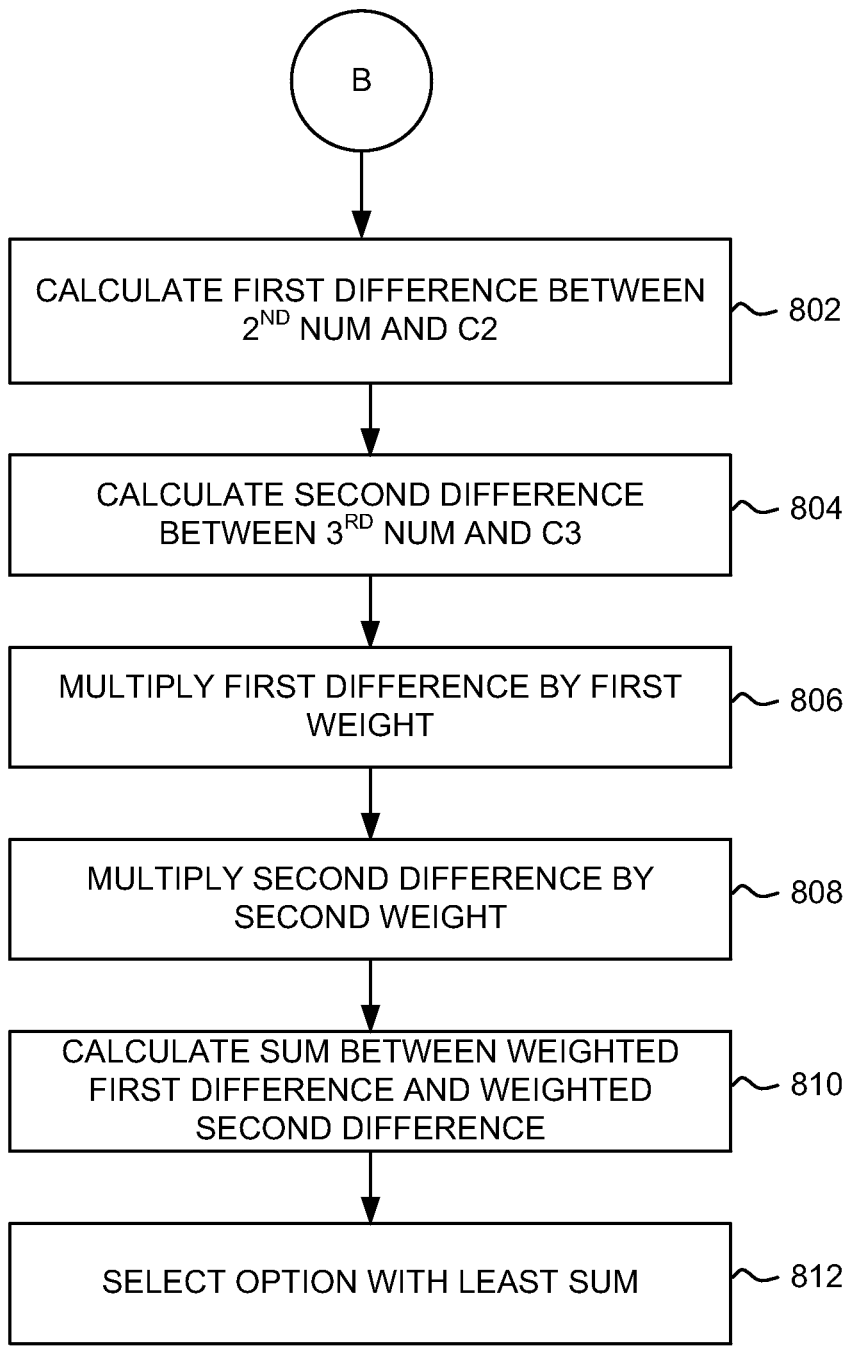
FIG. 8 illustrates another exemplary method of determining a power option for an access node.

FIGS. 7 and 8 illustrate exemplary methods for weighing power options. The methods will be discussed with reference to the exemplary communication system 500 illustrated in FIG. 5, however, the method can be implemented with any suitable communication system. The methods of FIGS. 7 and 8 may be implemented with the method of FIG. 6. For example, step 618 of FIG. 6 may comprise the method steps of FIGS. 7 and 8.

Referring to FIG. 7, at step 702, for each power option, it is determined whether the estimated second number meets a second criteria and whether the estimated third number meets a third criteria. For example, where four power options are determined, the estimated second number of wireless devices for each power option may be compared to a second criteria and the estimated third number of wireless devices for each power option may be compared to a third criteria.

In an embodiment, the second number of wireless devices and the third number of wireless devices may comprise a percentage. For instance, the second number may comprise a percentage of wireless devices in communication with access node 526 that comprise met application requirements when a particular power option is performed. The third number may comprise a percentage of wireless devices in communication with access nodes that neighbor access node 526 (e.g., access node 528 and access node 530) that experience interference when a particular power option is performed.

FIG. 9 depicts tables 902, 904, and 906 for weighing power options. Table 902 comprises four power options, an estimated second number for each power option, and an estimated third number for each power option. The estimated second numbers and the estimated third number are represented as percentages. In an embodiment, the second criteria may comprise a lower-bound percentage for the second number and the third criteria may comprise an upper-bound percentage for the third number. Table 904 comprises the second criteria and the third criteria, where the criteria are represented as percentages.

In the depicted example, the first power option comprises an estimated second number of 75 and an estimated third number of 5, the second power option comprises an estimated second number of 75 and an estimated third number of 15, the third power option comprises an estimated second number of 85 and an estimated third number of 20, and the fourth power option comprises an estimated second number of 90 and an estimated third number of 30. The second criteria comprises a lower-bound percentage of 75 for the estimated second numbers and the third criteria comprises an upper-bound percentage of 25 for the estimated third numbers.

The first power option meets the criteria since the estimated second number of 75 meets the second criteria of 75 and the estimated third number of 5 meets the third criteria of 25. The second power option meets the criteria since the estimated second number of 75 meets the second criteria of 75 and the estimated third number of 15 meets the third criteria of 25. The third power option meets the criteria since the estimated second number of 85 meets the second criteria of 75 and the estimated third number of 20 meets the third criteria of 25. The fourth power option does not meet the criteria. Although the estimated second number of 90 meets the second criteria of 75, the estimated third number of 30 does not meet the third criteria of 25.

At step 702, when, for at least one power option, the estimated second number meets the second criteria and the estimated third number meets the third criteria, the method progresses to step 704. When no power option has an estimated second number that meets the second criteria and an estimated third number that meets the third criteria, the method progresses to the method of FIG. 8. In the example depicted by FIG. 9, the first, second, and third power options comprise an estimated second number that meets the second criteria and an estimated third number that meets the third criteria. Accordingly, in this example, the method progresses to step 704.

At step 704, it is determined whether more than one power option comprises an estimated second number that meets the second criteria and an estimated third number that meets the third criteria. When one power option comprises estimated numbers that meet the criteria, the method progresses to step 706. At step 706, the one power option is selected. In the example depicted in FIG. 9, the first, second, and third power options comprise estimated numbers that meet the criteria. Here, the first, second, and third power options may comprise a subset of power options that meet the criteria. Accordingly, in this example, the method progresses to step 708.

At step 708, for each power option that meets the criteria, a first difference is calculated between the second number and the second criteria. In this example, the difference is calculated as Estimated Second Number−Second Criteria=First Difference. Accordingly, as illustrated in table 906, the first differences comprise 0, 0, and 10 for the first power option, second power option, and third power option, respectively.

At step 710, for each power option that meets the criteria, a second difference is calculated between the third number and the third criteria. In this example, the difference is calculated as Third Criteria−Estimated Third Number=Second Difference. Accordingly, as illustrated in table 906, the second differences comprise 20, 10, and 5 for the first power option, second power option, and third power option, respectively.

At step 712, for each power option that meets the criteria, the first difference is multiplied by a first weight. For example, table 904 illustrates the first weight as 1.25. A first weight greater than 1 may indicate that the second number is to be weighed more heavily than the third number and a first weight less than 1 may indicate that the second number is to be weighed less heavily than the third number. The weighted first difference may be calculated as First Difference*First Weight=Weighted First Difference. Accordingly, as illustrated in table 906, the weighted first differences comprise 0, 0, and 12.5 for the first power option, second power option, and third power option, respectively.

At step 714, for each power option that meets the criteria, the second difference is multiplied by a second weight. For example, table 904 of FIG. 9 depicts the second weight as 0.75. A second weight greater than 1 may indicate that the third number is to be weighed more heavily than the second number and a second weight less than 1 may indicate that the third number is to be weighed less heavily than the second number. The weighted second difference may be calculated as Second Difference*Second Weight=Weighted Second Difference. Accordingly, as illustrated in table 906, the weighted second differences comprise 15, 7.5, and 3.75 for the first power option, second power option, and third power option, respectively.

At step 716, a sum of the weighted first difference and the weighted second difference is calculated. For example, as illustrated in table 906, the sums may comprise 15, 7.5, and 16.25 for the first power option, second power option, and third power option, respectively. At step 718, the power option with the greatest sum is selected. For example, the third power option may be selected because it comprises the greatest sum. Accordingly, access node 526 may transmit the first signal according to the third power option.

FIG. 10 illustrates another example of weighing power options. For example, table 1002 illustrates that the first power option comprises an estimated second number of 75 and an estimated third number of 5, the second power option comprises an estimated second number of 75 and an estimated third number of 15, the third power option comprises an estimated second number of 85 and an estimated third number of 20, and the fourth power option comprises an estimated second number of 90 and an estimated third number of 30. Table 1004 illustrates that the second criteria comprises a lower-bound percentage of 90 for the estimated second numbers and the third criteria comprises an upper-bound percentage of 5 for the estimated third numbers.

Referring to FIG. 7, at step 702, it is determined that none of the power options comprise an estimated second number that meets the second criteria and an estimated third number that meets the third criteria. Accordingly, the method may progress to FIG. 8.

At step 802, for each power option, a first difference is calculated between the second number and the second criteria. In this example, the difference is calculated as Second Criteria—Estimated Second Number=First Difference. Accordingly, as illustrated in table 1006, the first differences comprise 15, 15, 5 and 0 for the first power option, second power option, third power option, and the fourth power option, respectively.

At step 804, for each power option, a second difference is calculated between the third number and the third criteria. In this example, the difference is calculated as Estimated Third Number—Third Criteria=Second Difference. Accordingly, as illustrated in table 1006, the second differences comprise 0, 10, 15 and 20 for the first power option, second power option, and third power option, and fourth power option, respectively.

At step 806, for each power option, the first difference is multiplied by a first weight. For example, table 1004 illustrates the first weight as 1.25. The weighted first difference may be calculated as First Difference*First Weight=Weighted First Difference. Accordingly, as illustrated in table 1006, the weighted first differences comprise 18.75, 18.75, 6.25, and 0 for the first power option, second power option, third power option, and fourth power option, respectively.

At step 808, for each power option, the second difference is multiplied by a second weight. For example, table 1004 illustrates the second weight as 0.75. The weighted second difference may be calculated as Second Difference*Second Weight=Weighted Second Difference. Accordingly, as illustrated in table 1006, the weighted second differences comprise 0, 7.5, 11.25, and 18.75 for the first power option, second power option, third power option, and fourth power option, respectively.

At step 810, for each power option, a sum of the weighted first difference and the weighted second difference is calculated. For example, as illustrated in table 1006, the sums may comprise 18.75, 26.25, 17.25, and 18.75 for the first power option, second power option, third power option, and fourth power option, respectively. At step 812, the power option with the least sum is selected. For example, the third power option may be selected because it comprises the least sum. Accordingly, access node 526 may transmit the first signal according to the third power option.

It should be noted that the first difference and second difference are calculated differently in the methods of FIGS. 7 and 8. For example, in the method of FIG. 7, the calculations comprise: Estimated Second Number–Second Criteria=First Difference and Third Criteria–Estimated Third Number=Second Difference. In the method of FIG. 8, the calculations comprise Second Criteria–Estimated Second Number=First Difference and Estimated Third Number–Third Criteria=Second Difference. This can account for the difference of selecting the power option with the greatest sum in the method of FIG. 7 but selecting the power option with the least sum in the method of FIG. 8.

FIG. 11 illustrates another example of weighing power options. For example, table 1102 illustrates that the first power option comprises an estimated second number of 75 and an estimated third number of 5, the second power option comprises an estimated second number of 75 and an estimated third number of 15, the third power option comprises an estimated second number of 85 and an estimated third number of 20, and the fourth power option comprises an estimated second number of 90 and an estimated third number of 30. Table 1104 illustrates that the second criteria comprises a lower-bound percentage of 90 for the estimated second numbers and the third criteria comprises an upper-bound percentage of 10 for the estimated third numbers.

Referring to FIG. 7, at step 702, it is determined that none of the power options comprise an estimated second number that meets the second criteria and an estimated third number that meets the third criteria. Accordingly, the method may progress to FIG. 8.

Similar to the descriptions for FIG. 8 herein, the steps 802-810 may be performed until table 1106 comprises the First Difference, Second Difference, Weighted First Difference, Weighted Second Difference and Sums for the power options as illustrated. Here, it should be noted that power option 1 comprises a negative second difference. This is because the calculation comprises Estimated Third Number–Third Criteria=Second Difference (e.g., 5−10=−5). Accordingly, when performing the method steps of FIG. 8, if an estimated third number is below the third criteria (e.g., lower-bound for the third number), the subsequent second difference is negative. Similarly, if an estimated second number is above the second criteria (e.g., upper-bound for the second number), the subsequent first difference is negative. In this example, the third power option comprises the least sum and the third power option may be selected.

In an embodiment, the first weight and the second weight may be adjusted such that the selected power option is adjusted. For example, the first weight may be used to weigh the met application requirements for a first plurality of wireless devices (e.g., the estimated second number). The second weight may be used to weigh the interference for a second plurality of wireless devices (e.g., the estimated third number). Accordingly, the weights may be adjusted to adjust how these elements are balanced.

In an embodiment, the second criteria and the third criteria may be adjusted such that the selected power option is adjusted. For example, the second criteria may comprise a lower-bound for the number of wireless device among a first plurality of wireless devices that comprise a met application requirement (e.g., the second number of wireless devices). The third criteria may comprise an upper-bound for the number of wireless devices among a second plurality of wireless devices that experience interference (e.g., the third number of wireless devices). Accordingly, the criteria may be adjusted to adjust these bounds.

In an embodiment, one or more of the second criteria, the third criteria, the first weight, and the second weight may be adjusted based on the type of application requirements for the first plurality of wireless devices. For example, a fourth number of wireless devices from among the first plurality of wireless devices may be determined, where the fourth number of wireless devices comprise application requirements that meet an application requirement criteria. The application requirement criteria may comprise one or more of a QCI greater than a threshold, a GBR greater than a threshold, a minimum bit rate greater than a threshold, a maximum permitted data delay less than a threshold, a minimum throughput greater than a threshold, a maximum error rate less than a threshold, and a maximum data loss rate less than a threshold. In an embodiment, based on the fourth number of wireless devices meeting a fifth criteria, one of more of the second criteria, the third criteria, the first weight, and the second weight may be adjusted. For example, the application criteria may comprise of application requirements that request resource intensive services. For instance, application requirements that comprise high minimum bit rates, low data loss and/or error rates, low data delay, and the like. Applications such as VoIP applications or media streaming applications may comprise such application requirements. In this example, the first weight may be increased such that meeting the applications requirements for the first plurality of wireless devices comprises an increased weight and/or the second criteria may be increased such that the lower-bound for the second number of wireless devices is increased.

Figure 12:
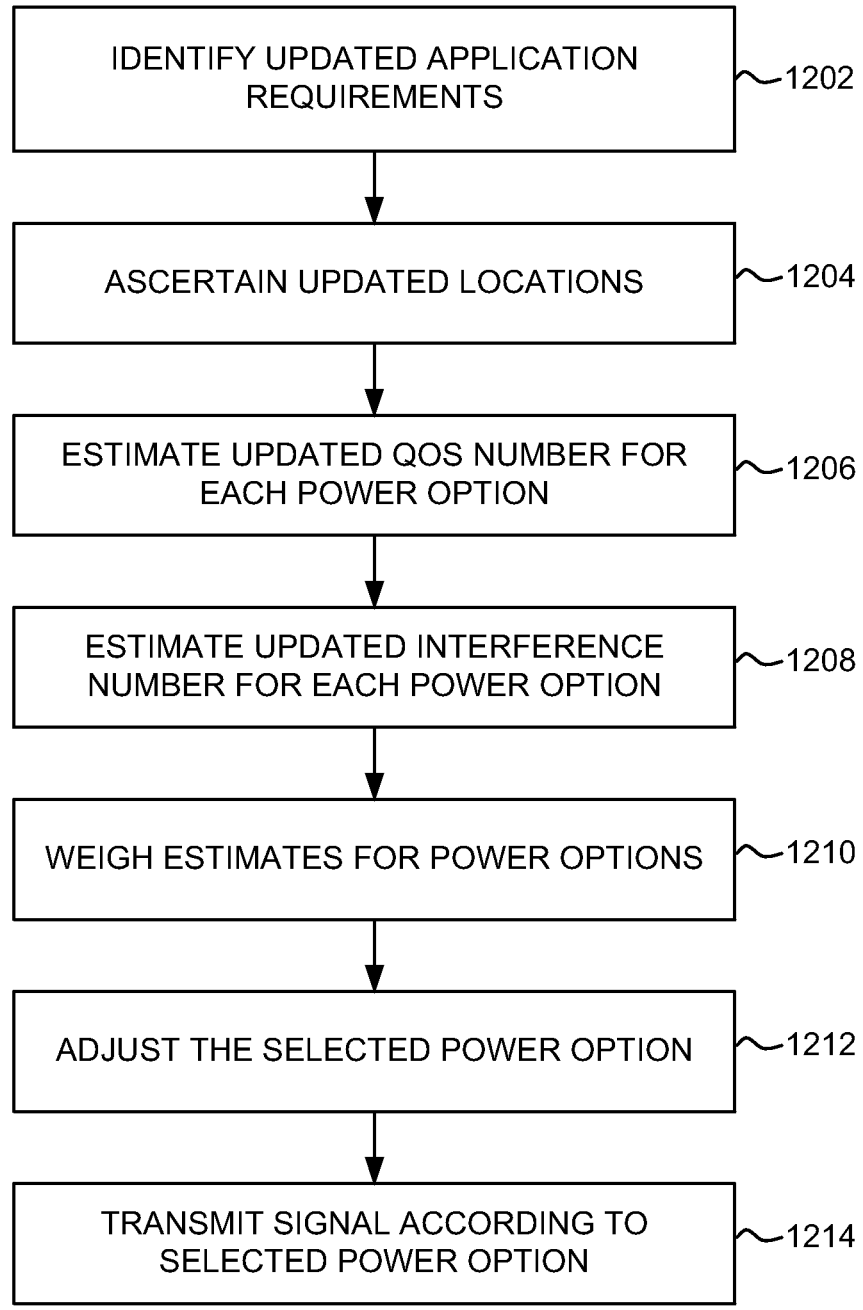
FIG. 12 illustrates another exemplary method of determining a power option for an access node.

FIG. 12 illustrates an exemplary method for determining a power option for an access node. The method will be discussed with reference to the exemplary communication system 500 illustrated in FIG. 5, however, the method can be implemented with any suitable communication system. The method of FIG. 12 may be implemented after the method of FIG. 6. For example, step 622 of FIG. 6 may be followed by step 1202 of FIG. 12.

Referring to FIG. 12, at step 1202, an updated application requirement for each of a first plurality of wireless devices in communication with a first access node is identified. For example, an updated application requirement for each of wireless devices 502, 504, 506, 508, and 510 may be identified. The updated application requirement may comprise a QCI, a GBR, a MBR, a priority, a minimum bit rate, a maximum permitted data delay, a minimum throughput, a maximum error rate, a maximum data loss rate, and any other suitable requirement. The updated application requirements may be identified similar to the manner in which the application requirements are identified at step 604 of FIG. 6.

At step 1204, for each power option, an updated second number from among the first plurality of wireless devices that comprise application requirements that are met is estimated. An updated estimated second number for a power option may comprise an updated number of wireless devices that will have the updated application requirement for that wireless device met when the first access node transmits a signal, such as a reference signal or pilot signal, according to the power option. The updated estimated second number may be estimated similar to the manner in which the second number is estimated at step 610 of FIG. 6.

At step 1206, updated locations are ascertained for wireless devices that are in communication with neighboring access nodes. For example, updated locations may be ascertained for wireless devices 512, 516, and 522 in communication with access node 528 and for wireless devices 514, 518, 520, and 524 in communication with access node 530. In an embodiment, the updated locations may be ascertained based on the signal level for one or more detected signals. The updated locations may be ascertained similar to the manner in which the locations are ascertained at step 612 of FIG. 6.

At step 1208, for each power option, an updated third number of wireless devices in communication with a second access node is estimated, wherein the first signal transmitted according to the power option interferes with a communication between the updated third number of wireless devices and the second access node. In an embodiment, a first access node may be in communication with a first plurality of wireless devices and a second access node may be in communication with a second plurality of wireless devices, where the two access node are neighboring. An updated estimated third number for a power option may comprise a number of the second plurality of wireless devices that will experience interference (e.g., interference beyond a threshold level) when the first access node transmits a signal, such as a reference signal or pilot signal, according to the power option. The updated estimated third number may be estimated similar to the manner in which the third number is estimated at step 616 of FIG. 6.

At step 1210, the updated estimated second number and the updated estimated third number for each power option are weighed. For example, for each power option, the updated estimated second number and updated estimated third number may be compared to criteria. The updated estimated second number and the updated estimated third number for each power option may be weighed similar to the manner in which the estimated numbers are weighed at step 618 of FIG. 6.

At step 1212, a selected power option is adjusted based on the updated estimated second number and the updated estimated third number. For example, an updated power option may be selected based on the weighing at step 1210. Accordingly, the previously selected power option may be adjusted to the updated selected power option. At step 1214, the first signal may be transmitted according to the updated selected power option. For example, a first signal, such as a reference signal or pilot signal, may be transmitted according to the updated selected power option. In this example, the power options may comprise a plurality signal levels for transmitting the first signal (e.g., 1.5 dB, 3 dB, 4.5 dB, 6 dB, and the like), and the first signal may be transmitted with a signal level corresponding to the selected power option.

In an embodiment, a power option may be selected based on the method of FIG. 6, and the method of FIG. 12 may be performed to adjust the selected power option at some point in time after the method of FIG. 6 is performed. For example, the method of FIG. 6 may be performed and after a predetermined period of time, the method of FIG. 12 may be performed.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 13:
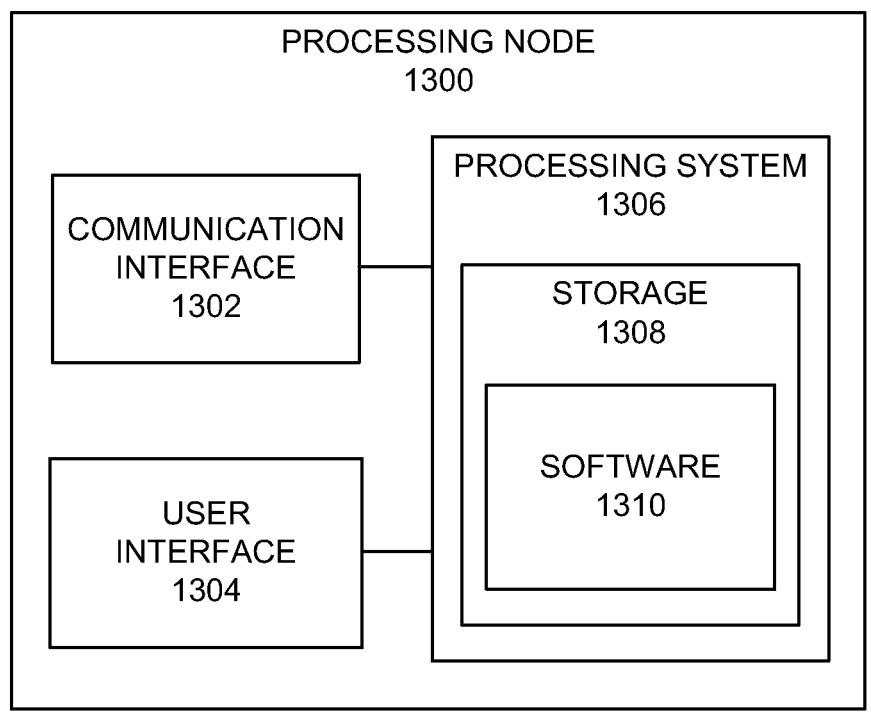
FIG. 13 illustrates an exemplary processing node.

FIG. 13 illustrates an exemplary processing node 1300 in a communication system. Processing node 1300 comprises communication interface 1302, user interface 1304, and processing system 1306 in communication with communication interface 1302 and user interface 1304. Processing node 1300 can be configured to determine a communication access node for a wireless device. Processing system 1306 includes storage 1308, which can comprise a disk drive, flash drive, memory circuitry, or other memory device. Storage 1308 can store software 1310 which is used in the operation of the processing node 1300. Storage 1308 may include a disk drive, flash drive, data storage circuitry, or some other memory apparatus. Software 1310 may include computer programs, firmware, or some other form of machine-readable instructions, including an operating system, utilities, drivers, network interfaces, applications, or some other type of software. Processing system 1306 may include a microprocessor and other circuitry to retrieve and execute software 1310 from storage 1008. Processing node 1300 may further include other components such as a power management unit, a control interface unit, etc., which are omitted for clarity. Communication interface 1302 permits processing node 1300 to communicate with other network elements. User interface 1304 permits the configuration and control of the operation of processing node 1300.

Examples of processing node 1300 include controller node 510 and gateway node 512. Processing node 1300 can also be an adjunct or component of a network element, such as an element of access nodes 104, 106, 504, 506, or 508. Processing node 1300 can also be another network element in a communication system. Further, the functionality of processing node 1300 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and nonremovable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a power option for an access node, comprising:
    identifying an application requirement for each of a first plurality of wireless devices in communication with a first access node;
    determining, from among the first plurality of wireless devices, a first number of wireless devices comprising application requirements that are met;
    determining, when the first number of wireless devices meets a first criteria, a plurality of power options for transmitting a first signal from the first access node;
    estimating, for each power option based on transmission of the first signal according to each power option, a second number of wireless devices from among the first plurality of wireless devices comprising application requirements that are met by each power option;
    estimating, for each power option based on transmission of the first signal according to each power option, a third number of wireless devices in communication with a second access node, wherein the first signal transmitted according to each power option interferes with a communication between the third number of wireless devices and the second access node; and
    selecting one of the plurality of power options when the estimated second number of wireless devices meets a second criteria and the estimated third number of wireless devices meets a third criteria.

2. The method of claim 1, wherein selecting one of the plurality of power options further comprises:
    determining a subset of power options from among the plurality of power options, wherein for each of the subset of power options the estimated second number of wireless devices meets the second criteria and the estimated third number of wireless devices meets the third criteria;
    calculating, for each of the subset of power options, a first difference between the estimated second number of wireless devices and the second criteria and a second difference between the estimated third number of wireless devices and the third criteria;
    calculating, for each of the subset of power options, a sum of the first difference and the second difference;
    selecting one of the subset of power options with the greatest sum.

3. The method of claim 1, further comprising:
    determining a fourth number of wireless devices from among the first plurality of wireless devices that comprise application requirements that meet an application requirement criteria; and
    increasing the second criteria when the fourth number of wireless devices meets a fifth criteria.

4. The method of claim 3, wherein the application requirement criteria comprises one or more of: a QCI greater than a first threshold, a GBR greater than a second threshold, a minimum bit rate greater than a third threshold, a maximum permitted data delay less than a fourth threshold, a minimum throughput greater than a fifth threshold, a maximum error rate less than a sixth threshold, and a maximum data loss rate less than a seventh threshold.

5. The method of claim 1, wherein selecting one of the plurality of power options further comprises:
    determining, for each of the power options, that the estimated second number of wireless devices does not meet a second criteria or that the estimated third number of wireless devices does not meet a third criteria;
    calculating, for each of the subset of power options, a first difference between the estimated second number of wireless devices and the second criteria and a second difference between the estimated third number of wireless devices and the third criteria;
    calculating, for each of the subset of power options, a sum of the first difference and the second difference; and
    selecting one of the subset of power options with the least sum.

6. The method of claim 1, wherein estimating the third number of wireless devices further comprises:
    ascertaining locations for the third number wireless devices; and
    estimating, for each of the power options based on transmission of the first signal according to each power option, the third number of wireless devices, wherein the first signal transmitted according to each power option will interfere with the communication between the third number of wireless devices at each ascertained location and the second access node.

7. The method of claim 6, wherein estimating the third number of wireless devices for the second plurality of wireless devices further comprises:
    determining a coverage radius for the first signal;
    estimating, for each power option based on transmission of the first signal according to each power option, an increased coverage radius of the first signal when the first access node performs each power option;
    determining, for each power option based on transmission of the first signal according to each power option, an overlap area between the estimated increased coverage radius and a coverage radius for a second signal transmitted from the second access node; and estimating, for each power option based on transmission of the first signal according to each power option, the third number of wireless devices wherein the first signal transmitted according to each power option will interfere with the communication between the third number of wireless devices located within the overlap area and the second access node.

8. The method of claim 1, further comprising:
determining updated application requirements for each of a first plurality of wireless devices;
estimating, for each power option based on transmission of the first signal according to each power option, an updated first number of wireless devices for the first plurality of wireless devices based on the updated application requirements;
estimating, for each power option based on transmission of the first signal according to each power option, an updated second number of wireless devices for the second plurality of wireless devices; and
adjusting the selected power option based on the updated first number of wireless devices and the updated second number of wireless devices.

9. The method of claim 1, further comprising transmitting the first signal according to the selected power option.

10. A system for determining a power option for an access node, comprising:
a first access node, a second access node, and a controller, the controller configured to:
identify an application requirement for each of a first plurality of wireless devices in communication with the first access node;
determine, from among the first plurality of wireless devices, a first number of wireless devices comprising application requirements that are met;
determine, when the first number of wireless devices meets a first criteria, a plurality of power options for transmitting a first signal from the first access node;
estimate, for each power option based on transmission of the first signal according to each power option, a second number of wireless devices from among the first plurality of wireless devices comprising application requirements that are met;
estimate, for each power option based on transmission of the first signal according to each power option, a third number of wireless devices in communication with the second access node, wherein the first signal transmitted according to each power option interferes with a communication between the third number of wireless devices and the second access node; and
select one of the plurality of power options when the estimated second number of wireless devices meets a second criteria and the estimated third number of wireless devices meets a third criteria.

11. The system of claim 10, wherein selecting one of the plurality of power options further comprises:
determining a subset of power options from among the plurality of power options, wherein for each of the subset of power options the estimated second number of wireless devices meets the second criteria and the estimated third number of wireless devices meets the third criteria;
calculating, for each of the subset of power options, a first difference between the estimated second number of wireless devices and the second criteria and a second difference between the estimated third number of wireless devices and the third criteria;
calculating, for each of the subset of power options, a sum of the first difference and the second difference;
selecting one of the subset of power options with the greatest sum.

12. The system of claim 10, wherein the controller is further configured to:
determine a fourth number of wireless devices from among the first plurality of wireless devices that comprise application requirements that meet an application requirement criteria; and
increase the second criteria when the fourth number of wireless devices meets a fifth criteria.

13. The system of claim 12, wherein the application requirement criteria comprises one or more of: a QCI greater than a first threshold, a GBR greater than a second threshold, a minimum bit rate greater than a third threshold, a maximum permitted data delay less than a fourth threshold, a minimum throughput greater than a fifth threshold, a maximum error rate less than a sixth threshold, and a maximum data loss rate less than a seventh threshold.

14. The system of claim 10, wherein selecting one of the plurality of power options further comprises:
determining, for each of the power options, that the estimated second number of wireless devices does not meet a second criteria or that the estimated third number of wireless devices does not meet a third criteria;
calculating, for each of the subset of power options, a first difference between the estimated second number of wireless devices and the second criteria and a second difference between the estimated third number of wireless devices and the third criteria;
calculating, for each of the subset of power options, a sum of the first difference and the second difference; and
selecting one of the subset of power options with the least sum.

15. The system of claim 10, wherein estimating the third number of wireless devices further comprises:
ascertaining locations for the third number of wireless devices; and
estimating, for each of the power options option based on transmission of the first signal according to each power option, the third number of wireless devices, wherein the first signal transmitted according to each power option will interfere with the communication between the third number of wireless devices at each ascertained location and the second access node.

16. The system of claim 15, wherein estimating the third number of wireless devices for the second plurality of wireless devices further comprises:
determining a coverage radius for the first signal;
estimating, for each power option based on transmission of the first signal according to each power option, an increased coverage radius of the first signal when the first access node performs each power option;
determining, for each power option based on transmission of the first signal according to each power option, an overlap area between the estimated increased coverage radius and a coverage radius for a second signal transmitted from the second access node; and
estimating, for each power option based on transmission of the first signal according to each power option, the third number of wireless devices wherein the first signal transmitted according to each power option will interfere with the communication between the third number of wireless devices located within the overlap area and the second access node.

17. The system of claim 10, wherein the controller is further configured to:
- determine updated application requirements for each of a first plurality of wireless devices;
- estimate, for each power option based on transmission of the first signal according to each power option, an updated first number of wireless devices for the first plurality of wireless devices based on the updated application requirements;
- estimate, for each power option based on transmission of the first signal according to each power option, an updated second number of wireless devices for the second plurality of wireless devices; and
- adjust the selected power option based on the updated first number of wireless devices and the updated second number of wireless devices.

18. The system of claim 10, wherein the first access node is configured to: transmit the first signal according to the selected power option.

\* \* \* \* \*